(12) United States Patent
Sabinski et al.

(10) Patent No.: US 6,175,177 B1
(45) Date of Patent: Jan. 16, 2001

(54) PERMANENT MAGNET-EXCITED ASSEMBLY OF AN ELECTRICAL MACHINE, AND PROCESS FOR ITS MANUFACTURE

(75) Inventors: Joachim Sabinski; Hans Kuss, both of Dresden (DE)

(73) Assignee: VEM Sachsenwerk GmbH, Dresden (DE)

( * ) Notice: Under 35 U.S.C. 154(b), the term of this patent shall be extended for 0 days.

(21) Appl. No.: 09/416,849

(22) Filed: Oct. 12, 1999

(30) Foreign Application Priority Data

Oct. 12, 1998 (DE) .............................................. 198 46 924

(51) Int. Cl.$^7$ ........................... H02K 15/03; H02K 21/14
(52) U.S. Cl. ............................................... 310/156; 310/42
(58) Field of Search ............................. 310/156, 42, 216, 310/217, 218; 29/598

(56) References Cited

U.S. PATENT DOCUMENTS

| | | | |
|---|---|---|---|
| 3,072,813 | * | 1/1963 | Reijnst et al. ........................ 310/156 |
| 3,979,821 | * | 9/1976 | Noodleman ........................... 310/156 |
| 4,445,062 | * | 4/1984 | Glaser ................................... 310/156 |
| 4,504,755 | * | 3/1985 | Semones et al. ..................... 310/156 |
| 5,091,668 | * | 2/1992 | Cuenot et al. ........................ 310/156 |
| 5,378,953 | * | 1/1995 | Uchida et al. ........................ 310/156 |
| 6,029,336 | * | 2/2000 | Kliman et al. ....................... 310/156 |

FOREIGN PATENT DOCUMENTS

| | | |
|---|---|---|
| 40 33 454 | 4/1992 | (DE) . |
| 689 06 910 | 11/1993 | (DE) . |
| 44 23 620 | 1/1996 | (DE) . |
| 195 35 256 | 4/1997 | (DE) . |
| 196 48 758 | 6/1998 | (DE) . |

\* cited by examiner

*Primary Examiner*—Clayton LaBalle
(74) *Attorney, Agent, or Firm*—Collard & Roe, P.C.

(57) ABSTRACT

The invention relates to a permanent magnet-excited assembly of an electrical machine, as well as to a process for producing in particular a synchronous machine with a ferromagnetic body and permanent magnets arranged therein, for application as compact solutions for drives. According to the invention, punched single-component metal sheet disks or metal sheet strips (2) of the type known per se, with slots (3) and teeth (4) toward the back accommodate a arrangement of internal slots (5). The number and position of the internal slots (5) are adapted to the slots (3) for receiving the permanent magnets (7). A narrow removable bridge (9) is first arranged between the inner slots (5) and the slots (3). The pack of sheet metal elements is subsequently laminated and then solidified with non-ferromagnetic material (6). Following curing of the solidification, the slots (3) are milled down to the non-ferromagnetic material (6). Permanent magnets (7) are inserted in preferably semi-open slots (3) and solidified. Openings (8) are arranged in the interior of the laminated teeth (4) in the lower zone toward the base of the slot. Finally, the entire permanent magnet-excited assembly as defined by the invention is set by methods known in the field of electrical machine building.

8 Claims, 2 Drawing Sheets

PERMANENT MAGNET-EXCITED ASSEMBLY OF AN ELECTRICAL MACHINE, AND PROCESS FOR ITS MANUFACTURE

The invention relates to a permanent magnet-excited assembly of an electrical machine, and to a process for the manufacture of such an assembly; in particular of a synchronous machine with a ferromagnetic body and permanent magnets arranged therein, preferably for application as compact solutions for drives.

Rotating electrical machines operating with permanent magnet excitation are known as transversal flux machines, on the one hand. Such machines structured on the basis of the transversal flux principle can be operated both as motors and generators. As a rule, the rotor consists of one or a plurality of concentric rings, which are separated from each other by one or a plurality of plastic rings axially lined up in a row and disposed between said concentric rings, or by rings consisting of another type of electrically nonconductive material, and/or by a rotor disk, with so-called collector or soft-iron elements being alternatingly arranged in such rings along the circumference. Such collector or soft-iron elements are normally structured from axially laminated electrosheet material, with magnets being arranged on the latter. Such concentric rings are referred to also as the pole structure. The problem posed in connection with all transversal flux machines is the mechanical strength of the rotor structure. It is known that attempts are being made to obtain the required strength by gluing, whereby the glued joints are additionally reinforced with simple construction elements such as, for example bolts, screws, rivets etc. Also, bandages are increasingly employed on the surface of the rotor in order to manage the stress caused by centrifugal forces. One drawback of such additional elements is that the latter substantially increase the volume of the rotor, and that the manufacturing and processing expenditure is high. Furthermore, if the safety elements are arranged through the rings, either the magnets in the divided form are subjected to high working and manufacturing expenditure, or the soft-iron elements if such additional elements are passed through or arranged within the region of said soft-iron elements. Moreover, with such designs, the enlargement of the rotor in the radial direction causes deterioration of the surface-to-volume ratio, which determines the cooling conditions, whereby cooling is is problematic in connection with transversal flux machines in any case. DE-PS 195 35 256 describes a solution which is expected to avoid said drawbacks. For said solution, provision is made for a mulitude of additional pulling elements acting in the axial direction, such elements being disposed on at least one diameter outside of the zone enclosed by the so-called limit diameter. However, this solution further increases the manufacturing expenditure as compared to the glued design.

Electrical machines with permanent-magnet excitation have been developed in the course of the past years with increasingly higher capacities, favored by engineering measures, special control circuits with higher switching frequencies, and permanent magnet materials of high energy density which became available in the meantime. Capacities have been achieved in the meantime on such high levels that the problem of eddy current losses is being noticed in substantially negative ways. It is generally known in the field of electric machine engineering to structure both the stator and the rotor in a laminated way in order to avoid eddy current losses. Laid-open DE-OS 196 48 758 describes an electrical machine with permanent-magnet excitation with ferromagnetic rotor feedback, where laminated sheet disks and a type of layered permanent magnet are employed for avoiding eddy current losses. Both with the external rotor and the internal rotor machine, the permanent magnets are arranged here externally on the circumference of the lamination. The drawback here is that the manufacturing expenditure continues to be high for heavy-duty machines.

In DE-OS 44 23 620, individual permanent magnets are arranged in a cylindrical yoke consisting of isotropic permanent magnet material. This design, however, is suitable only for rotating electrical machines with very low capacity. The rotor is designed in this connection in the form of a bell rotor.

Several permanent magnets in a cylindrical rotor body are known from DE-OS 40 33 454. However, here, the permanent magnet material is injected for reasons of mechanical strength. This solution limits the application of modern permanent magnet materials with high energy density and is suitable only for rotating electrical machines with low output. The exclusive use of ferromagnetic material for the basic body of the rotor increases the leakage field component of the permanent magnet, which conditions the use of an increased amount of permanent magnet material.

The invention is based on the problem of providing a permanent magnet-excited assembly of an electrical machine that improves the mechanical strength of said assembly overall and also of the components of said assembly; which reduces the number of components of the assembly; and enhances the efficiency of the overall heavy-duty electrical machine; as well as on the problem of developing a process for the manufacture of said assembly that reduces the production expenditures and permits its production in series.

According to the invention, the problem is solved by the characterizing features of the first two claims. The permanent magnet-excited assembly as defined by the invention, and the process for its manufacture lead to the realization of a construction coming close to the tested principles in other fields of electric machine engineering. In particular, the mechanical strength of the entire construction is suitable for rough operating conditions. The operational safety and the useful life of the drives produced with the permanent magnet-excited assemblies as defined by the invention can now satisfy the requirements for such application cases. And series production is feasible with known machines, plants and technologies employed in electrical machine building.

The invention is explained in greater detail in the following on an exemplified embodiment with the help of the drawing, in which.

Figure 1:
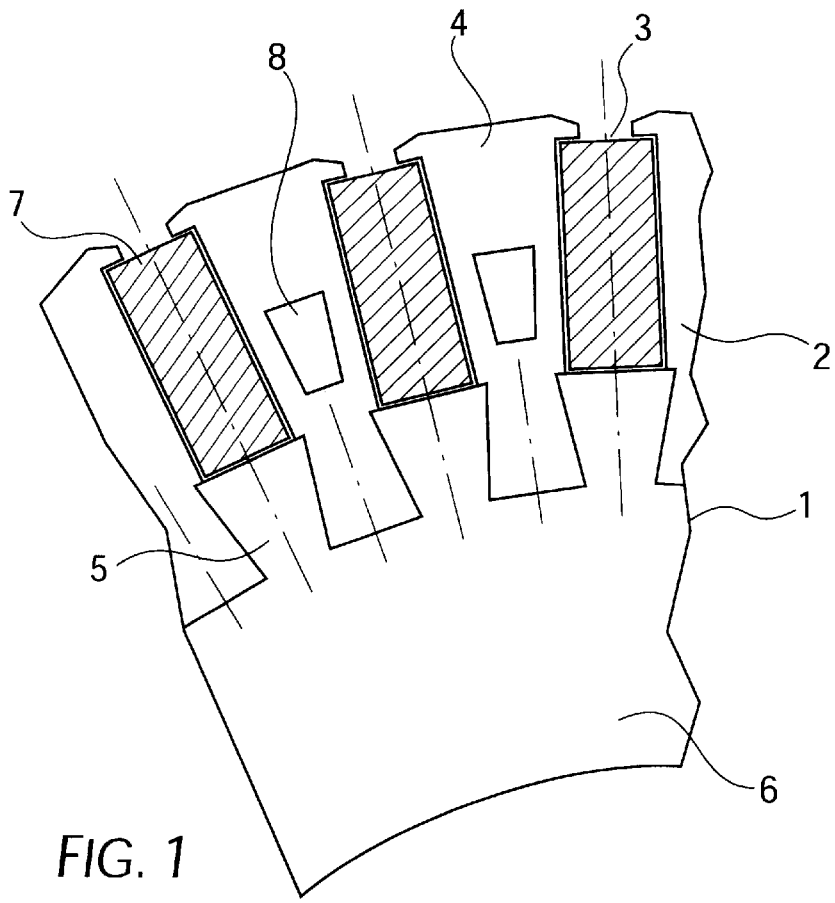
FIG. 1 shows a part of an permanent magnet-excited assembly of an electrical machine as defined by the invention, with the design of a rotor of a rotating electrical synchronous machine being shown here by a cross sectional view.
Figure 2:
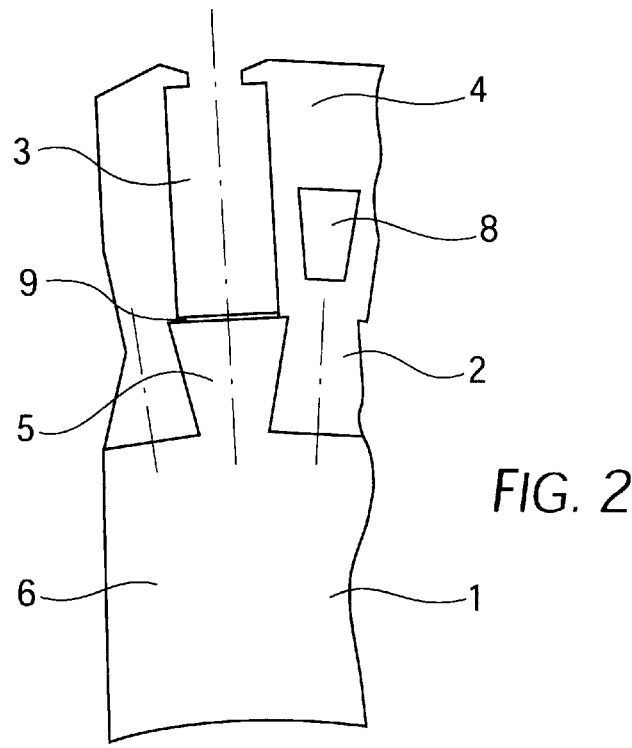
FIG. 2 shows a cutout of a lamination with the narrow removable bridge.

The rotor 1 as defined by the invention for a permanent magnet-excited rotating electrical machine consists of punched one-part sheet metal disks or sheet metal strips 2 (here the rotor laminatio n disks), which are known per se, with slots 3 (here the rotor slots) and teeth 4 (here the rotor teeth), and is additionally provided with the inner slots 5 towards the back (here the rotor shaft), said slots preferably being in the form of a dovetail, in the present case with the narrow bridge toward the rotor shaft. The number and position of the inner slots 5 are adapted to the slots 3 (here the rotor slots) for receiving the permanent magnets. The inner slots 5 may have different shapes, for exmple an oval form.

To begin with, a narrow removable bridge 9 is still arranged between the slots 3 (here the rotor slots) and the inner slots 5. The prefabricated single-part sheet metal disks or sheet metal strips 2 (here the rotor sheet metal disks), which are known per se, with the narrow removable bridges 9 as defined by the invention between the slot 3 (here the rotor slot) and the inner slot 5, are laminated to form a ferromagnetic body (here the rotor lamination).

The laminated sheet metal disks or sheet metal strips 2 (here the rotor lamination) are subsequently solidified among each other by means of the nonferromagnetic material 6. Solidification of the laminated sheet metal disks or sheet metal strips 2 (here the rotor lamination) is preferably carried out by means of pouring aluminum around the lamination. In another embodiment, solidification with non-ferromagnetic material 6 is carried out based on impregnable glass fiber mats inserted in the inner slots 5, and specially molded, preferably triangularly shaped glass fiber wedges admitted therein. Following curing of the solification, the narrow removable bridges 9 as defined by the invention are removed by milling the slots 3 (here the rotor slots) down to the nonferromagnetic material 6 filling the inner slot 5.

Now, the permanent magnets 7, which are enveloped by swelling material (not shown in the figure), preferably by glass fiber mats capable of swelling, are mounted in the semi-open slots 3. The open slot parts (here the rotor slot parts) are covered in this step as well. In the interior of the laminated teeth 4 (here the rotor slot parts), the openings 8 are arranged in the lower zone toward the base of the slot (here the rotor slot base), said openings being preferably trapezoidal and adapted to the external shape of the tooth. Subsequently, the pre-mounted permanent magnet-excited assembly (here the rotor) as defined by the invention is cured by methods known in the field of electrical machine construction. Curing is preferably carried out by the vacuum pressure impregnation (VPI) process.

Figure 3:
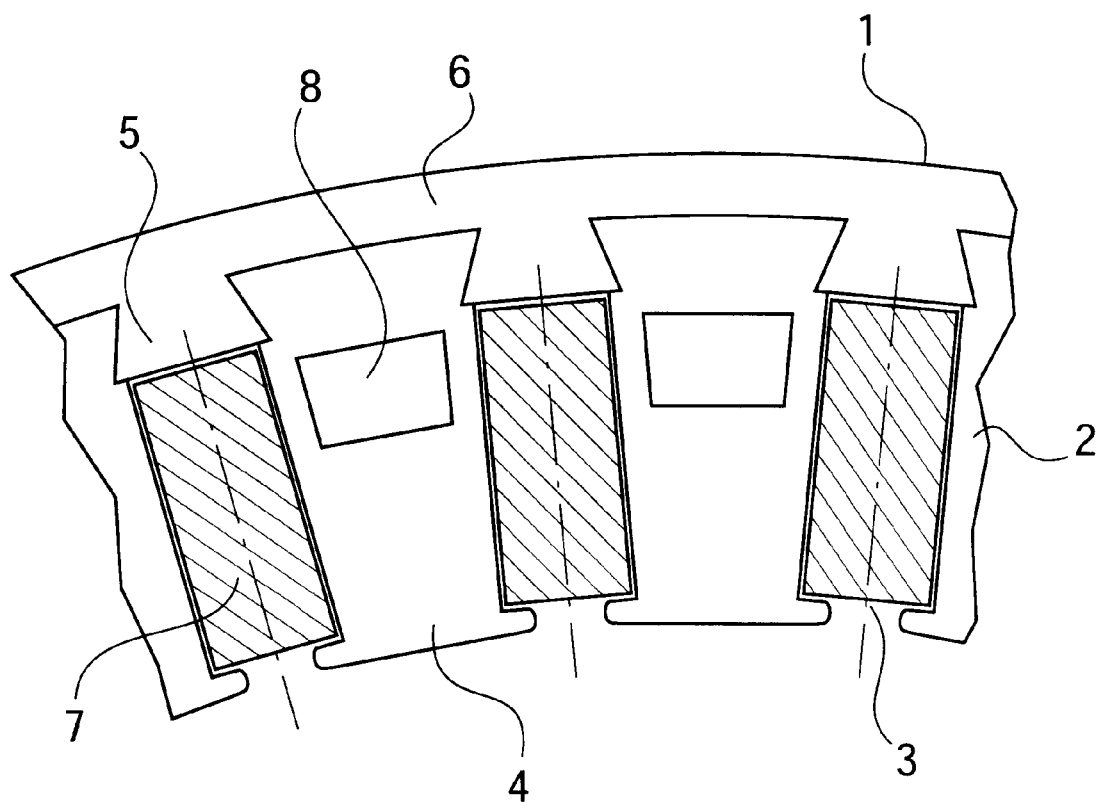
FIG. 3 shows an embodiment in the form of an external rotor machine.

FIG. 3 shows the embodiment of a permanent magnet-excited assembly as defined by the invention in the form of an external rotor. In this embodiment, the inner slots 5 as defined by the invention are located on the outside and have very little depth. Solidification by means of the non-ferromagnetic material 6 results in a thin-walled, closed cylindrical housing-like outer ring. Solidification is preferably carried out by means of casting in aluminum. Following curing, the narrow removable bridges are removed by milling and the external rotor is mounted further and finished analogous to the internal rotor.

In another manufacturing variation, solidification by means of nonferromagnetic material 6 can be separately produced in the form of an extra solidification body, and the permanent magnet-excited assembly (here the lamination) made of single-part sheet metal disks can be individually incorporated in the solidfication body by gluing or shrinking it into the latter. Instead of the sheet metal disks, the tooth-like individual poles can be produced separately and inserted individually in the nonferromagnetic solidification body. For this purpose, the nonferromagnetic solidifying body must have a corresponding number of internal slots.

What is claimed is:

1. A permanent magnet-excited subassembly of a synchronous motor, comprising:
   (a) a ferromagnetic body, comprising a stacked plurality of armature plates comprising sheet metal elements reinforced with a ferromagnetic material;
   (b) a plurality of slots arranged in a front region of each of said sheet metal elements;
   (c) a plurality of teeth that border said slots and extend toward said front region of said plurality of sheet metal elements;
   (d) a plurality of internal grooves arranged in and facing a back region of said plurality of sheet metal elements and located directly behind said plurality of slots, wherein the number and position of said internal grooves corresponds to the number and position of said plurality of slots and wherein the internal grooves are reinforced with a nonferromagnetic material;
   (e) at least one removable narrow bridge arranged between said plurality of slots and said plurality of internal grooves; and
   (f) a plurality of permanent magnets arranged within said ferromagnetic body and inserted into said plurality of slots.

2. The permanent magnet-excited subassembly according to claim 1, wherein the internal slots have a cross-section in the shape of a dovetail.

3. The permanent magnet-excited subassembly according to claim 1, further comprising openings corresponding to the external shapes of the teeth and arranged in an interior, lower region, of the teeth near a base area of the slots.

4. The permanent magnet-excited subassembly according to claim 3, wherein the openings in the interior of the teeth have a trapezoidal cross-section.

5. The permanent magnet-excited subassembly according to claim 1, wherein the slots are semi-open.

6. The permanent magnet-excited subassembly according to claim 1, wherein the permanent magnets are coated with a swelling material.

7. A process for producing a permanent magnet-exited subassembly of a synchronous motor, comprising the steps of:
   stacking a plurality of sheet metal elements, each having external slots for receiving magnets, teeth located between each external slot, and internal grooves, to form a stack of armature plates;
   reinforcing said plurality of sheet metal elements by pouring a nonferromagnetic material into the internal grooves;
   removing narrow bridges between the external slots and grooves after solidifying the poured material by milling the slots of the ferromagnetic body down to the nonferromagnetic material filling the internal grooves;
   mounting permanent magnets in said external slots; and
   curing the subassembly.

8. The process for producing a permanent magnet-excited subassembly according to claim 7, wherein the curing is carried out by a vacuum pressure impregnation process.

* * * * *